(12) United States Patent
Chiu et al.

(10) Patent No.: US 7,180,353 B2
(45) Date of Patent: Feb. 20, 2007

(54) APPARATUS AND METHOD FOR LOW POWER CLOCK DISTRIBUTION

(75) Inventors: You-Ming Chiu, Taipei Hsien (TW); Yung-Chieh Yu, Hsin-Chu Hsien (TW)

(73) Assignee: Mediatek Incorporation, Hsin-Chu Hsien (TW)

( * ) Notice: Subject to any disclaimer, the term of this patent is extended or adjusted under 35 U.S.C. 154(b) by 44 days.

(21) Appl. No.: 10/906,100

(22) Filed: Feb. 3, 2005

(65) Prior Publication Data

US 2006/0170480 A1 Aug. 3, 2006

(51) Int. Cl.
*G06F 1/04* (2006.01)
(52) U.S. Cl. ...................... 327/295; 327/333
(58) Field of Classification Search ............ None
See application file for complete search history.

(56) References Cited

U.S. PATENT DOCUMENTS

| | | | |
|---|---|---|---|
| 5,675,808 A | 10/1997 | Gulick et al. | |
| 5,850,157 A | 12/1998 | Zhu et al. | 327/295 |
| 5,900,752 A * | 5/1999 | Mar | 327/143 |
| 5,994,924 A | 11/1999 | Lee et al. | |
| 6,067,257 A | 5/2000 | Kitsukawa et al. | |
| 6,072,348 A | 6/2000 | New et al. | |
| 6,111,448 A * | 8/2000 | Shibayama | 327/293 |
| 6,252,449 B1 | 6/2001 | Hanriat | |
| 6,396,137 B1 * | 5/2002 | Klughart | 257/691 |
| 6,434,704 B1 | 8/2002 | Dean et al. | 713/320 |
| 6,501,311 B2 * | 12/2002 | Lutkemeyer | 327/161 |
| 6,525,949 B1 * | 2/2003 | Johnson et al. | 363/60 |
| 6,624,681 B1 | 9/2003 | Loyer et al. | |
| 6,657,474 B2 * | 12/2003 | Varadarajan | 327/291 |
| 6,818,929 B2 | 11/2004 | Tsutsumi et al. | |
| 6,822,481 B1 | 11/2004 | Srikantam et al. | |
| 6,829,715 B2 * | 12/2004 | Chiao et al. | 713/401 |
| 6,848,058 B1 | 1/2005 | Sinclair et al. | |
| 6,879,158 B2 | 4/2005 | Zhu | |

* cited by examiner

*Primary Examiner*—Timothy P. Callahan
*Assistant Examiner*—Cassandra Cox
(74) *Attorney, Agent, or Firm*—Winston Hsu

(57) ABSTRACT

A clock distribution apparatus for providing a local clock signal having a first voltage swing to a circuit unit being on a same substrate includes a global clock distribution network for generating and distributing a global clock signal having a second voltage swing being less than the first voltage swing; and a local clock converting unit being electrically connected between the global clock distribution network and the circuit unit. The local clock converting unit includes a level shifter for converting the global clock signal into the local clock signal.

12 Claims, 3 Drawing Sheets

APPARATUS AND METHOD FOR LOW POWER CLOCK DISTRIBUTION

BACKGROUND

The present invention relates to clock distribution circuitry, and more particularly, to low power clock distribution circuitry.

In integrated circuit designs, a clock distribution network (also referred to as a "clock tree") consumes a considerable percentage of the total active power of the integrated circuit. Therefore, in the related art, a power savings technique referred to as "clock-gating" is widely applied to moderate overall power consumption within the integrated circuit.

The clock-gating technique reduces the power consumption of the clock distribution tree by disabling or "gating off" the clocks fed to some circuit units of the integrated circuit while those circuit units are not in use.

A problem with clock gating is that it requires additional logic (e.g., clock gating logic) and a control unit to manage the clock gating control signals. In order to have a net power savings, the clock gating logic must consume less power than is saved by gating the clocks off.

Unfortunately, the related art clock gating techniques do not provide significant power reduction when the integrated circuit is in full operation. That is, the power savings of the integrated circuit is not obvious or is limited when intensive processing is occurring and/or all circuit units of the integrated circuit are in use. Accordingly, a need exists for improving the power consumption of clock trees.

SUMMARY OF INVENTION

It is therefore an objective of the claimed invention to provide a low power clock distribution apparatus and related method to solve the above-mentioned problems.

According to an exemplary embodiment of the present invention, a clock distribution apparatus for providing a local clock signal having a first voltage swing to a circuit unit is disclosed comprising: a global clock distribution network for generating and distributing a global clock signal having a second voltage swing being less than the first voltage swing; and a local clock converting unit electrically connected between the global clock distribution network and the circuit unit, the local clock converting unit comprising a level shifter for converting the global clock signal into the local clock signal. Wherein the clock distribution apparatus and the circuit unit are on a same substrate.

According to another exemplary embodiment of the present invention, a method for providing a local clock signal having a first voltage swing to a circuit unit is disclosed. The method comprises generating a global clock signal having a second voltage swing being less than the first voltage swing; distributing the global clock signal; and utilizing a level shifter to convert the global clock signal into the local clock signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
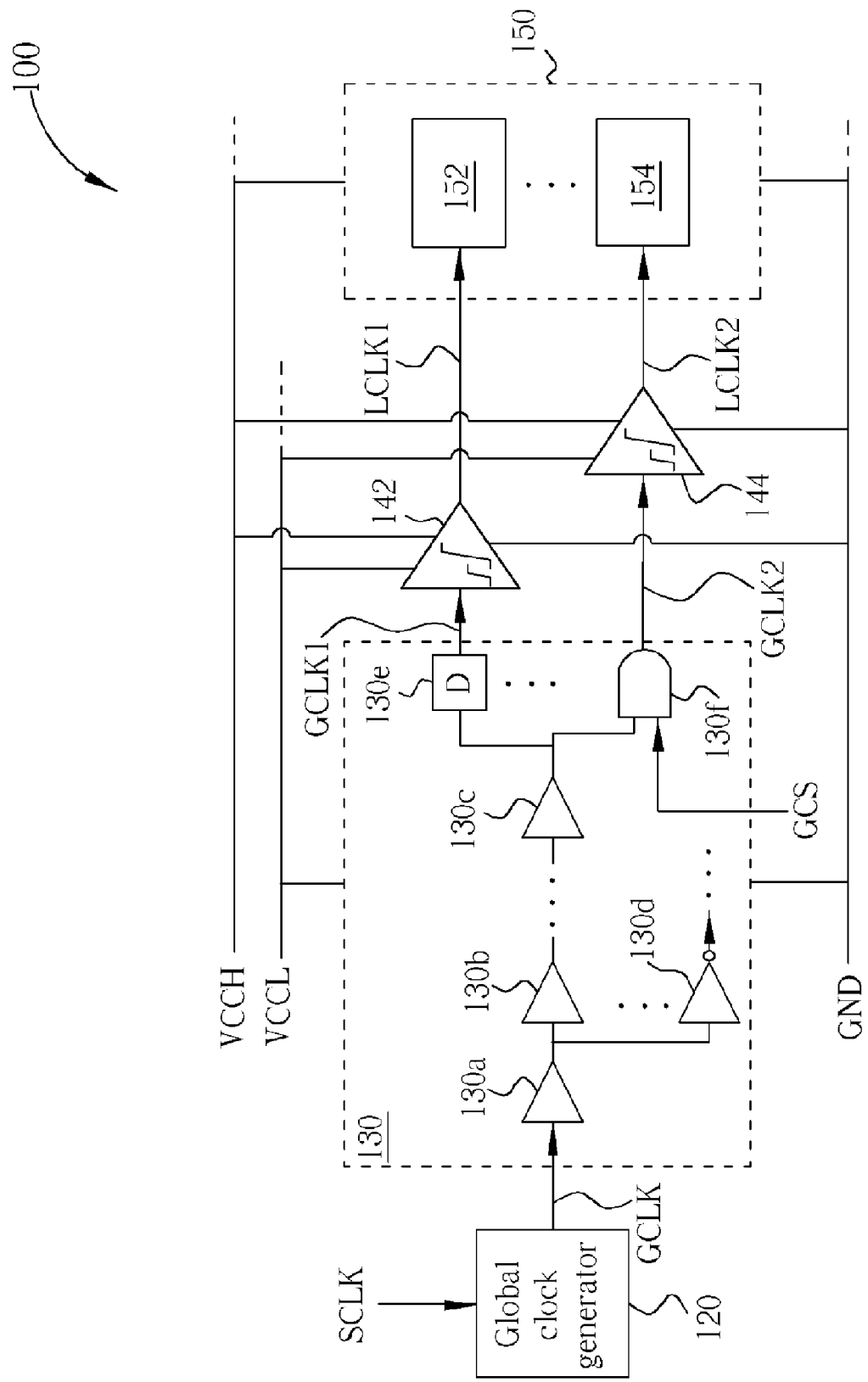
FIG. 1 is a block diagram of a clock distribution network according to a first embodiment of the present invention.

Please refer to FIG. 1, which shows a block diagram of a clock distribution network 100 according to a first embodiment of the present invention. As shown in FIG. 1, the clock distribution network 100 comprises a global clock generator 120, a distribution network 130 electrically connected to the global clock generator 120, and two level shifters 142 and 144 electrically connected between the distribution network 130 and a high-voltage area 150. In this embodiment, the high-voltage area 150 comprises at least two circuit units 152 and 154. The two circuit units 152 and 154 operate at a first operating voltage VCCH and are electrically connected to the first level shifter 142 and the second level shifter 144, respectively. The two circuit units 152 and 154 may be any IC component. Generally, all components of the clock distribution network 100 are on a same substrate.

The clock distribution network 100 reduces power consumption by lowering the voltage swing of clock signal to be distributed. Specifically, the global clock generator 120 receives an input clock signal SCLK and accordingly produces a global clock signal GCLK, wherein the voltage swing of GCLK is lower than the voltage swing of SCLK. In practical implementations, the input clock signal SCLK is generated by a clock source (not shown) such as a crystal oscillator, a DCO (digital controlled oscillator), etc. In this embodiment, the input clock signal SCLK has a first voltage swing, which is substantially from a ground voltage GND to the first operating voltage VCCH, while the global clock signal GCLK has a second voltage swing, which is substantially from the ground voltage GND to a second operating voltage VCCL lower than the first operating voltage VCCH. The operation and implementations of the global clock generator 120 are well known in the art and therefore are not described further herein. The global clock signal GCLK is then distributed through the distribution network 130.

Depending on the circuit designs, the timing and/or phase of a global clock signal been transmitted to the first level shifter 142 may be differ to another global clock signal been transmitted to the second level shifter 144. Accordingly, as shown in FIG. 1, the global clock signal received by the first level shifter 142 is denoted as GCLK1 while the global clock signal received by the second level shifter 144 is denoted as GCLK2. Generally, both the global clock signals GCLK1 and GCLK2 have the same voltage swing as the global clock signal GCLK produced from the global clock generator 120. In other words, both the global clock signals GCLK1 and GCLK2 are low swing clock signals.

As shown in FIG. 1, each of the level shifters 142 and 144 is coupled to both the first operating voltage VCCH and the second operating voltage VCCL. In this embodiment, for example, the second operating voltage VCCL is 1.6V while the first operating voltage VCCH is 1.8V. In this embodiment, the first level shifter 142 is used for converting the low swing global clock signal GCLK1 into a full swing first local clock signal LCLK1. The second level shifter 144 is used for converting the low swing global clock signal GCLK2 into a full swing second local clock signal LCLK2. Preferably, both the first local clock signal LCLK1 and the second local clock signal LCLK2 have the same voltage swing as the input clock signal SCLK, i.e., the voltage swing of the first and second local clock signals LCLK1 and LCLK2 are substantially from the ground voltage GND to the first operating voltage VCCH. Accordingly, the local clock signals LCLK1 and LCLK2 can drive the circuit units 152 and 154, respectively. Depending on the circuit designs, the timing and/or phase of the first local clock signal LCLK1 could differ to that of the second local clock signal LCLK2.

As mentioned above, the low swing global clock signal GCLK is distributed through the distribution network 130. In order to achieve low power clock distribution, components of the distribution network 130 of this embodiment are designed to properly operate with the low swing global clock signal GCLK. In other words, all the components of the distribution network 130 are low-voltage components, which operate properly at the second operating voltage VCCL.

In the embodiment shown in FIG. 1, the distribution network 130 comprises a plurality of low-voltage components 130a–130f. Each of the plurality of low-voltage components 130a through 130f may be a driving stage for re-driving the global clock signal GCLK, a delay unit for delaying the timing of the global clock signal GCLK, a logical operating unit for performing a logical operation, a clock gating unit for serving the function of logic clock gating, or a multiplexer. For example, in the shown embodiment of FIG. 1, each of the low-voltage components 130a through 130c is a driving stage and could be implemented with a buffer. The low-voltage component 130d is an inverter, and the low-voltage component 130e is a delay unit, which could also be implemented with a buffer. The low-voltage component 130f is a clock gating unit and is typically implemented with a AND gate. In this embodiment, the clock distribution network 100 further comprises a control unit (not shown) for providing a gate control signal GCS to control the clock gating unit 130f. While the second circuit unit 154 is not in use, the transmission of the global clock signal GCLK generated by the clock gating unit 130f to the second level shifter 144 could be stopped according to the gate control signal GCS. In other embodiments, the clock gating unit may be implemented with an OR gate. In practice, clock gating may be performed at any stage of the distribution network 130.

As mentioned in the foregoing illustration, the global clock generator 120 is used for generating a low swing global clock signal GCLK and the distribution network 130 is used for distributing the low swing global clock signal GCLK. Thus, the combination of the global clock generator 120 and the distribution network 130 is regarded as a global clock distribution network. In addition, the disclosed techniques of the present invention could be used in conjunction with other known or future techniques for even further power reductions.

As is well known in the art, the level shifter could be integrated or embedded within other components (such as a logic gate, gating unit, buffer, etc.) in practical implementations.

Figure 2:
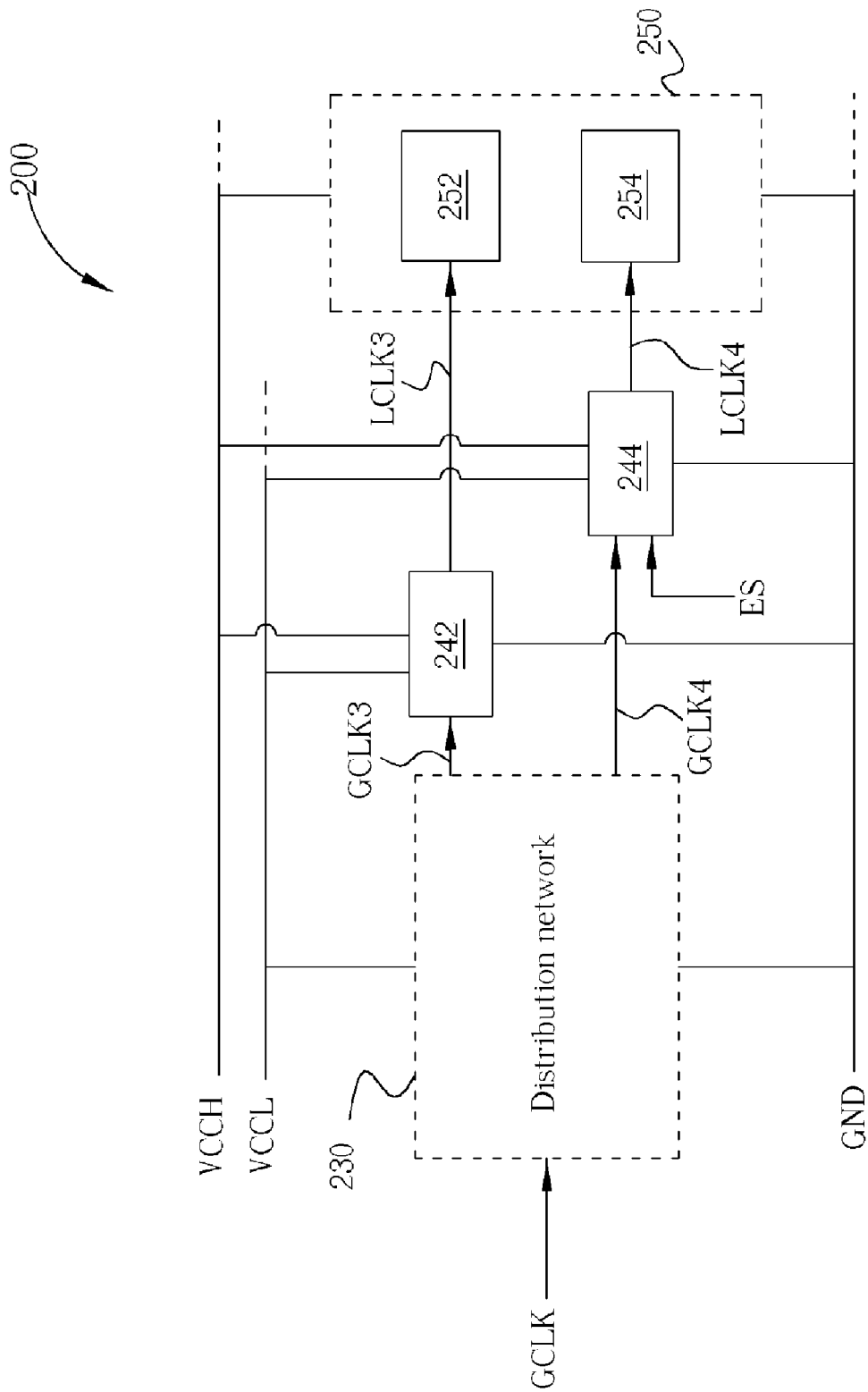
FIG. 2 is a simplified block diagram of a clock distribution network according to a second embodiment of the present invention.

FIG. 2 is a simplified block diagram of a clock distribution network 200 according to a second embodiment of the present invention. As shown, a distribution network 230 composed of low-voltage components operating at the second operating voltage VCCL distributes a low swing global clock signal GCLK to local clock converting units 242 and 244. The distribution network 230 is substantially the same as the distribution network 130 shown in FIG. 1, and a repeated description of its operation is therefore omitted here. In this embodiment, the first local clock converting unit 242 receives a low swing global clock signal GCLK3 from the distribution network 230 and accordingly produces a full swing local clock signal LCLK3 to a circuit unit 252 of a high-voltage area 250. The second local clock converting unit 244 receives a low swing global clock signal GCLK4 from the distribution network 230 and accordingly produces a full swing local clock signal LCLK4 to a corresponding circuit unit 254 of the high-voltage area 250. Similarly, the circuit units 252 and 254 operate at the first operating voltage VCCH while components of the distribution network 230 operate at the second operating voltage VCCL, which is lower than the first operating voltage VCCH.

In this embodiment, the first local clock converting unit 242, which may be integrated or embedded in a buffer, a delay unit, or a logic gate, is a level shifter for converting the low swing global clock signal GCLK3 into the full swing third local clock signal LCLK3. The second local clock converting unit 244 acts as a level shifter for converting the low swing global clock signal GCLK4 into the full swing fourth local clock signal LCLK4 and also acts as a clock enabling unit for enabling or disabling the clock signal based on an enabling signal ES. Typically, the enabling signal ES is controlled by a control unit (not shown) so as to disable the clock signal and avoid driving the second circuit unit 254 when the second circuit unit 254 is not in use. The second local clock converting unit 244 could be a clock gating unit comprising a level shifter. For example, the second local clock converting unit 244 could be with the integration of an AND gate and a level shifter.

Typically, employing a proper layout design could reduce the power consumption and chip area. As mentioned above, the distribution network composed of low-voltage components operating at the second voltage VCCL and the high-voltage area composed of high-voltage circuit units operating at the first voltage VCCH are generally on the same substrate. In other words, two different voltage supply lines are required in the same substrate.

Figure 3:
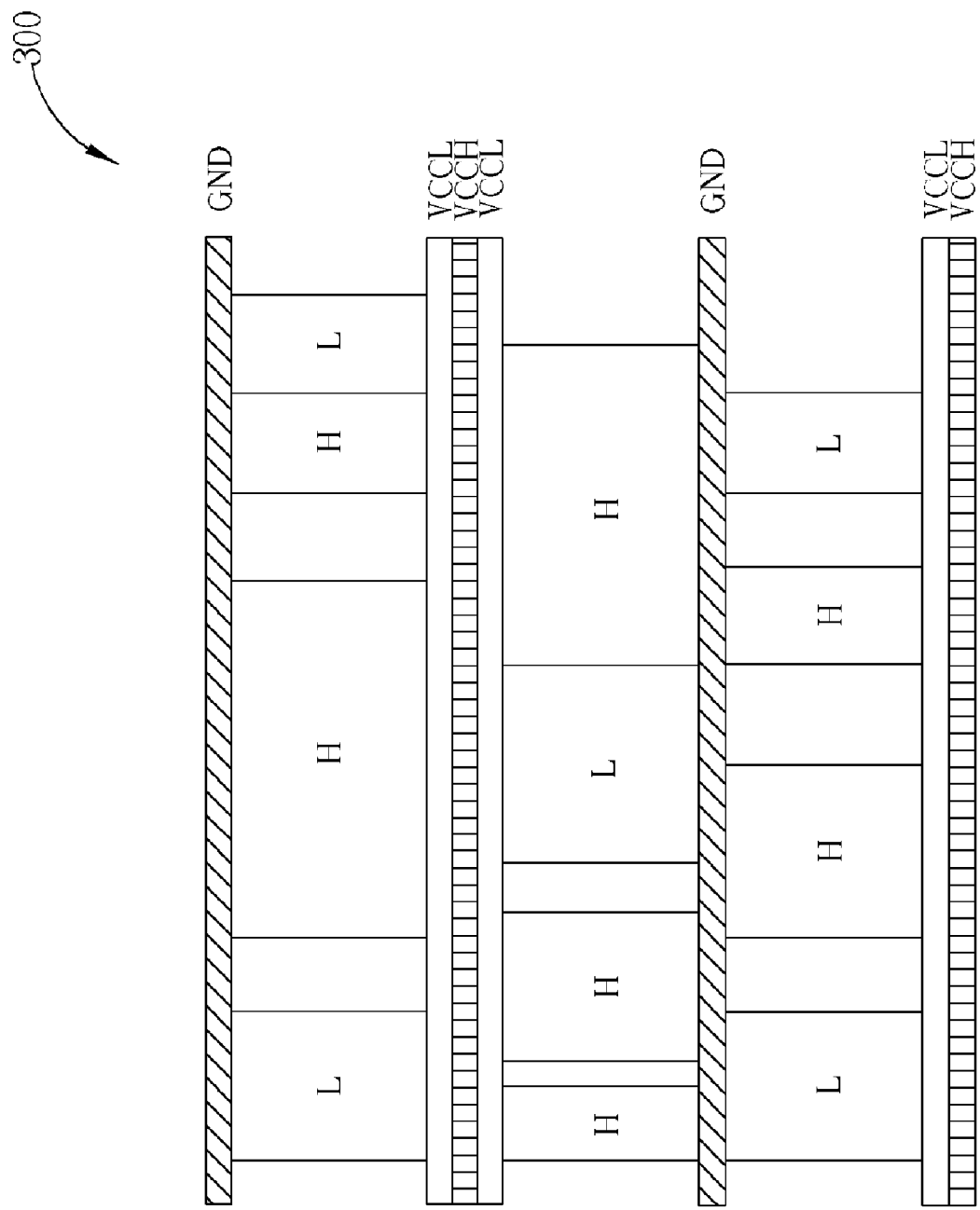
FIG. 3 shows a layout diagram of a clock distribution network according to an exemplary embodiment of the present invention.

FIG. 3 shows a layout diagram of a circuit layout 300 according to an exemplary embodiment of the present invention. In the circuit layout 300, high-voltage areas composed of high-voltage components are labeled as H while low-voltage areas composed of low-voltage components are labeled as L. As shown in FIG. 3, a dual-rail power mesh is employed for reducing the total length of voltage supply lines and signal lines. Due to the circuit layout 300, any two neighboring voltage supply lines can share the same ground voltage line, and each of the high-voltage areas and low-voltage areas can be supplied with the required operating voltage in a shortest distance. As a result, the power consumption contributed on the clock distribution networks is further reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A clock distribution apparatus for providing a local clock signal having a first voltage swing to a circuit unit, wherein the clock distribution apparatus and the circuit unit are on a same substrate, the clock distribution apparatus comprising:

a global clock distribution network comprising:

a global clock generator for generating a global clock signal having a second voltage swing being less than the first voltage swing; and a distribution network for distributing the global clock signal; and a local clock converting unit electrically connected between the global clock distribution network and the circuit unit, the local clock converting unit comprising a level shifter for converting the global clock signal into the local clock signal;

wherein the distribution network comprises at least one clock gating unit operating at the second voltage swing and being electrically connected between the global clock generator and the local clock converting unit.

2. The clock distribution apparatus of claim 1, wherein the first voltage swing is substantially from a ground voltage to a first operating voltage.

3. The clock distribution apparatus of claim 2, wherein the second voltage swing is substantially from the ground voltage to a second operating voltage, the second operating voltage being less than the first operating voltage.

4. The clock distribution apparatus of claim 1, wherein the local clock converting unit comprises a clock enabling unit for enabling or disabling the local clock signal according to an enabling signal.

5. The clock distribution apparatus of claim 4, wherein the clock enabling unit comprises the level shifter.

6. A clock distribution apparatus for providing a local clock signal having a first voltage swing to a circuit unit, wherein the clock distribution apparatus and the circuit unit are on a same substrate, the clock distribution apparatus comprising:

a global clock distribution network comprising:

a global clock generator for generating a global clock signal having a second voltage swing being less than the first voltage swing; and a distribution network for distributing the global clock signal; and a local clock converting unit electrically connected between the global clock distribution network and the circuit unit, the local clock converting unit comprising a level shifter for converting the global clock signal into the local clock signal;

wherein the distribution network comprises at least one multiplexer operating at the second voltage swing and being electrically connected between the global clock generator and the local clock converting unit.

7. The clock distribution apparatus of claim 6, wherein the first voltage swing is substantially from a ground voltage to a first operating voltage.

8. The clock distribution apparatus of claim 7, wherein the second voltage swing is substantially from the ground voltage to a second operating voltage, the second operating voltage being less than the first operating voltage.

9. A clock distribution apparatus for providing a local clock signal having a first voltage swing to a circuit unit, wherein the clock distribution apparatus and the circuit unit are on a same substrate, the clock distribution apparatus comprising:

a global clock distribution network for generating and distributing a global clock signal having a second voltage swing being less than the first voltage swing; and a local clock converting unit electrically connected between the global clock distribution network and the circuit unit, the local clock converting unit comprising a level shifter for converting the global clock signal into the local clock signal, and a clock enabling unit for enabling or disabling the local clock signal according to an enabling signal.

10. The clock distribution apparatus of claim 9, wherein the clock enabling unit comprises the level shifter.

11. The clock distribution apparatus of claim 9, wherein the first voltage swing is substantially from a ground voltage to a first operating voltage.

12. The clock distribution apparatus of claim 11, wherein the second voltage swing is substantially from the ground voltage to a second operating voltage, the second operating voltage being less than the first operating voltage.

* * * * *